(12) United States Patent
Harrison et al.

(10) Patent No.: US 9,558,103 B2
(45) Date of Patent: Jan. 31, 2017

(54) SYSTEM AND METHOD TO INDICATE CODE BLOCK EXECUTION

(75) Inventors: Keith Harrison, Chepstow (GB); Brian Quentin Monahan, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 626 days.

(21) Appl. No.: 13/217,892

(22) Filed: Aug. 25, 2011

(65) Prior Publication Data

US 2013/0055214 A1     Feb. 28, 2013

(51) Int. Cl.
*G06F 11/36*     (2006.01)
*G06F 9/44*      (2006.01)

(52) U.S. Cl.
CPC .................. *G06F 11/3676* (2013.01)

(58) Field of Classification Search
USPC ........................................................ 717/127
See application file for complete search history.

(56) References Cited

U.S. PATENT DOCUMENTS

| | | | |
|---|---|---|---|
| 5,754,760 A | 5/1998 | Warfield | |
| 6,314,529 B1 * | 11/2001 | Rana | 714/29 |
| 6,378,087 B1 * | 4/2002 | Flanagan et al. | 714/38.1 |
| 6,959,431 B1 * | 10/2005 | Shiels et al. | 717/124 |
| 7,530,057 B2 | 5/2009 | Babcock | |
| 7,827,534 B2 | 11/2010 | Vetillard et al. | |
| 8,015,553 B2 * | 9/2011 | Jung et al. | 717/132 |
| 8,141,053 B2 * | 3/2012 | Levine | 717/127 |
| 2003/0208744 A1 * | 11/2003 | Amir et al. | 717/124 |
| 2004/0260516 A1 * | 12/2004 | Czerwonka | 702/186 |
| 2005/0055674 A1 * | 3/2005 | Shidla et al. | 717/131 |
| 2006/0236156 A1 * | 10/2006 | Cunningham et al. | 714/38 |
| 2007/0006159 A1 * | 1/2007 | Hecht et al. | 717/124 |
| 2007/0168742 A1 | 7/2007 | Wadsworth et al. | |
| 2009/0249044 A1 | 10/2009 | Citron et al. | |
| 2009/0287963 A1 * | 11/2009 | Oglesby et al. | 714/38 |
| 2011/0047532 A1 * | 2/2011 | Wang | 717/130 |

OTHER PUBLICATIONS

Chilimbi et al., "Quantifying the Effectiveness of Testing via Efficient Residual Path Profiling," ACM, 2007, 4pg.*
Elbaum et al., "Improving Web Application Testing with User Session Data," IEEE, 2003, 11pg.*
Pavlopoulou at el., "Residual Test Coverage Monitoring," ACM, 1999, 8pg.*
Podgurski et al., "Estimation of Software Reliability by Stratified Sampling," ACM, 1999, 21pg.*
Steven et al., "jRapture: A Capture/Replay Tool for Observation-Based Testing," ACM, 2000, 10pg.*

* cited by examiner

*Primary Examiner* — Ryan Coyer
(74) *Attorney, Agent, or Firm* — Tarolli, Sundheim, Covell & Tummino L.L.P.

(57) ABSTRACT

In one implementation, computer executable instructions are provided to identify a group of instructions corresponding to a code block for an executable module. The instructions increment a counter associated with the code block to indicate the code block has been tested.

20 Claims, 6 Drawing Sheets

SYSTEM AND METHOD TO INDICATE CODE BLOCK EXECUTION

BACKGROUND

Testing of code generally has followed three traditional procedures. One procedure involves unit testing where a number of languages including Java, Python, and so forth encourage the designer to provide test procedures that exercise a particular portion of code. Thus, it is up to the designer to ensure that the unit tests completely cover all execution paths. Another testing procedure involves code coverage where tools are applied to determine code paths that have been traversed during testing. Still yet another form of testing includes ad hoc testing, where the programmer performs their own informal testing.

DETAILED DESCRIPTION

Figure 1:
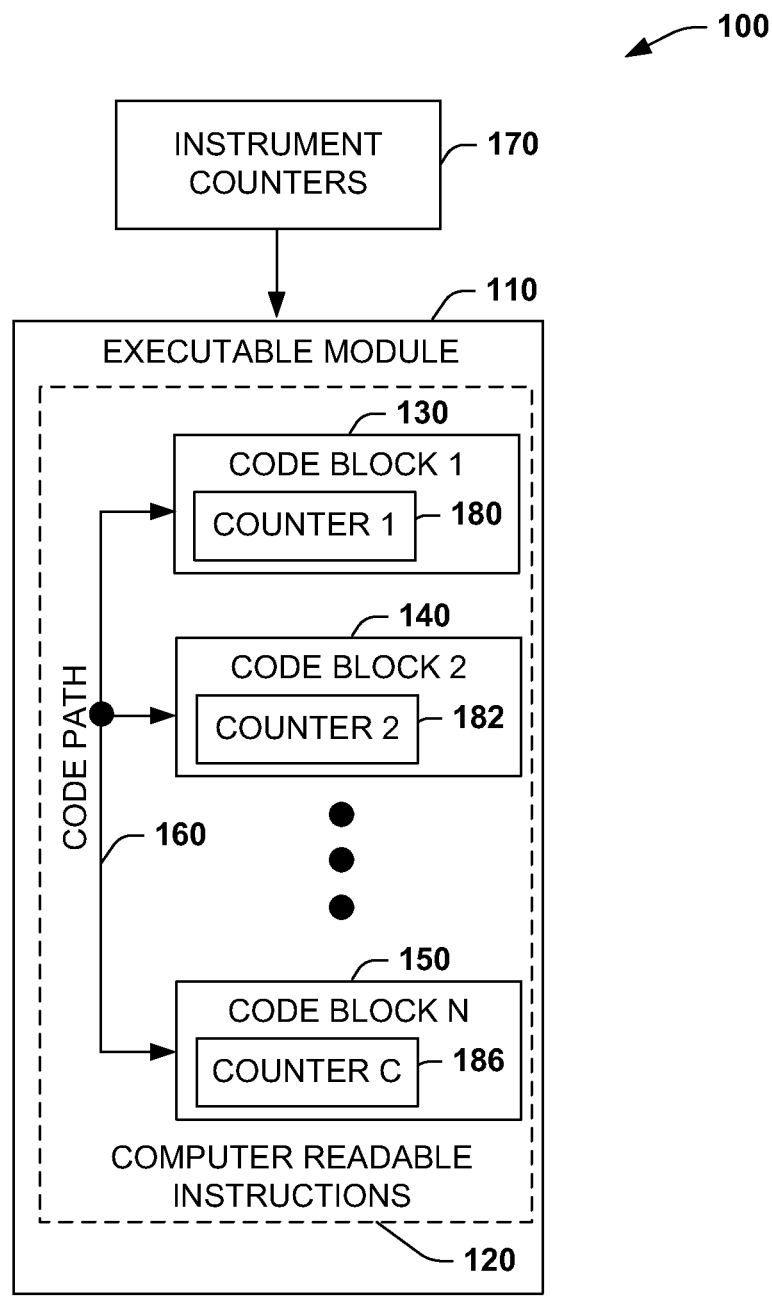
FIG. 1 illustrates an example of a code block verification system.

FIG. 1 illustrates an example of a code block verification system 100. The system 100 includes an executable module 110 that includes computer readable instructions 120. The executable module 110 includes a plurality of code blocks shown as code block 1 at 130, code block 2 at 140, through code block N at 150, where N is a positive integer. The code blocks 130-150 can represent various branches of computer readable instructions 120 that operate in the executable module 110, where such branches are illustrated in accordance with a code path 160. For example, the code path 160 can represent different branches or decisions that are encountered during the execution of a program. Thus, if code block 1 at 130 were identified as branch A along the code path 160, code block 2 at 140 might be identified as branch B along the code path 160. In one example, if an IF statement were encountered e.g., IF condition EQUALS TRUE, execute branch A beginning at code block 1 at 130 along code path 160, otherwise execute branch B beginning at code block 2 at 140. Thus, when conditional or other statements are encountered within the executable module 110, respective code blocks 130-150 are identified (e.g., the beginning address of code block determined) for respective execution branches along the code path 160. The code path 160 can include any number of branches, nested loops or other code constructs.

Various techniques can be employed to identify the code blocks 130-150 for the executable module, such as a beginning address (or label) of interrupt routines, jump locations to other addresses in the execution module 110, conditional branches, or substantially any condition that causes the execution module to vector to a new code execution point or group of instructions along the code path 160. The code path 160 could be a serial path of branches with each branch being a group of instructions identified by the respective code blocks 130-150. Alternatively or additionally, the code path 160 can be structured like a hierarchical tree where some branches may follow one another and some branches may be parallel and entered via various jumps, loops, interrupts, or other branch instructions As used herein, in some cases, the term "code block" may refer generally to a sequence of one or more non-branching machine/assembler instructions, with single entry and single exit points. A simple code block can consist of a single instruction, for example. Branch and jump instructions (e.g., for tests and subroutine calls) may not be considered to be included in code blocks as they instead may be considered to lie in between code blocks. Several branches can have the first instruction of a code block as their target—e.g., a design rule where a code block may be entered at the start and exit at the end thereof. Entries to a code block typically occur at the first instruction of the block. As desired, code blocks can be split up to ensure this condition—e.g., that no branch target occurs after the first instruction for any non-trivial code block. Executable code can be "tiled" with combinations of branch and jump instructions and with code blocks, for example.

When the code blocks 130-150 have been identified within the execution module 110, instrument counters 170 are utilized to associate various counters with code blocks, as demonstrated as counter 1 at 180, counter 2 at 182, and counter C at 186, where C is a positive integer denoting the number of counters. The instrument counters 170 represent code or other methods that associate the counters 180-186 with the respective code blocks 130-150. Such methods for example can include developer association of counters to code blocks, compiler association of counters to code blocks, or object code association of counters to code blocks, for example, as will be described below. The number of counters C can be correlated to the number of code blocks N; however, not all code blocks need to have a counter as some blocks may be identified as non-used code and counters can also be implemented to verify if a set of predetermined counters increment in a specified order.

The counters 180-186 can represent whether or not an associated code block has been executed. Additionally, the value of a counter can indicate how many times a given code block has been executed. For example, if code block 1 at 130 were executed at least one time, the counter 180 would show a positive value of 1 (greater than 1 if executed more than one time). If the code block 2 at 140 were never executed, then its respective counter 2 at 182 would show a non-incremented value (e.g., zero). The counters 180-186 can be utilized to test and verify execution of the code blocks 130-150 of the executable module 110. While the example of FIG. 1 demonstrates the counters 180, 182 and 186 as residing within respective code blocks 130, 140 and 150, it will be appreciated that counters can be implemented outside of code blocks (see, e.g., FIG. 3).

As an example, by associating the counters 180-186 with identified code blocks 130-150 and analyzing the counters after a desired amount of testing, it can be determined whether or not the code blocks 130-150 have been executed and therefore tested. Conversely, a counter for a given code block can also be evaluated to determine if a code block had not executed during such testing. Thus, various efficiencies may be observed by installing the counters 180-186 with the code blocks 130-150. For example, if the counters 180-186 were not provided, it may be difficult to ensure that code being executed during production runs has been tested. Also, it may be the case that programmers leave in code that does not, or cannot, be executed. Such code may not therefore need to be tested and may be identified as such (e.g., identified as non-production code and not instrumented with a counter). Further, it may be difficult to demonstrate to others that code has been adequately tested and thus, the use of counters 180-186 may provide a mechanism for such test verification.

By way of example, the counters 180-186 can be maintained within a data segment (e.g., a modifiable data element)—and generally cannot be located within read-only code segments unless the counter itself is read-only (not modifiable)—this can be a useful technique to incorporate the code information in a post-training phase, for example. As another example, the counters 180-186 can be maintained in an external file alongside the associated executable module 110 under test. The counters 180-186 can also be maintained in a local database, in a remote database or the functionality of the counters can be distributed among local and remote databases, for example. Furthermore, although the counters 180-186 are shown inside the respective code blocks 130-150, such counters could also be placed at a location remote to the code blocks. For example, executables in the code blocks 130-150 could make a remote call to code that increments a counter outside of the code block rather than from within the confines of the code block executable itself.

As will be described herein, the executable module 110 can be provided as a computer readable medium having computer readable instructions 120. This includes a code block 130-150 that corresponds to a group of instructions for an executable module 110 and a counter 180-186 installed with the code block 130-150 to indicate the code block has been tested (e.g., via its execution during a testing phase). The executable module 110 can be a hardware module or a computer readable module. For example, a computer readable module may include instructions executed from a CD ROM. A hardware module may include logic such as provided with a gate array or other programmable device. This could include testing of code such as Virtual Hardware Description Language, for example. The counters 180-186 can be incremented initially during a training phase or checked for a non-zero value during an intermediate testing phase, where a warning can be generated if a zero value is detected during such intermediate testing. The counters 180-186 can be utilized during a post-testing phase (e.g., after code has been released). During such post-testing use, the executable module can be programmed to generate a warning and to stop code execution if a zero value is detected in a counter during runtime execution.

The counters 180-186 can be implemented according to various techniques. One example includes associating counters via source code modifications, such that the counters are installed with the code blocks. This could include the designer providing counters and the associated verification logic during programming and identification of the respective branches and code paths. Alternatively, source code modification could occur automatically via a designer tool that automatically provides counters and associated logic and programmatically associates the counters with code blocks while the designer was creating or editing the program. In another example of counter association, a compiler may identify code blocks in a module and automatically insert counters and verification logic corresponding to the identified code blocks during compilation of the source code. For example, if an IF statement were encountered, the compiler could automatically install counters 180-186 at each resultant branch occurring from the IF conditional statement. In yet another example of counter association, code blocks may be identified and corresponding counters installed during object code execution. For example, a Low Level Virtual Machine (LLVM) could be employed to detect branches and provide counters 180-186 and associated verification logic into the object code. Counters also may be programmatically associated with respective code blocks during one or more of the code installation processes disclosed herein.

Counters 180-186 can be provided at various locations in the respective code blocks 130-150, example counter locations within a code block are shown. One possible location is at or near a code block entry point. Thus, a counter 180-186 could be incremented at or near the beginning address of a code block 130-150. In another example of counter location, an intermediate point within a respective code block 130-150 could include a counter. One or more such counters 180-186 could be provided throughout a code block as deemed appropriate. In another example, counters 180-186 could be provided at or near the exit point of code blocks. Thus, before the final return statement for a routine is executed, a counter could be provided.

Beyond the single counters 180-186 described above, alternative counter examples are possible. In one example, nested counters could be provided. For example, a nested counter could be a counter that increments when two or more other counters are incremented. In another example, a concurrency counter may be employed. Such counter may be employed to test foreground and background operations of a program. For example, it may be desirable to know that during execution of a given code block 130-150, which interrupt routines were also executed. Thus, a concurrency counter could be incremented when a given code block executed concurrently with some other routine.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
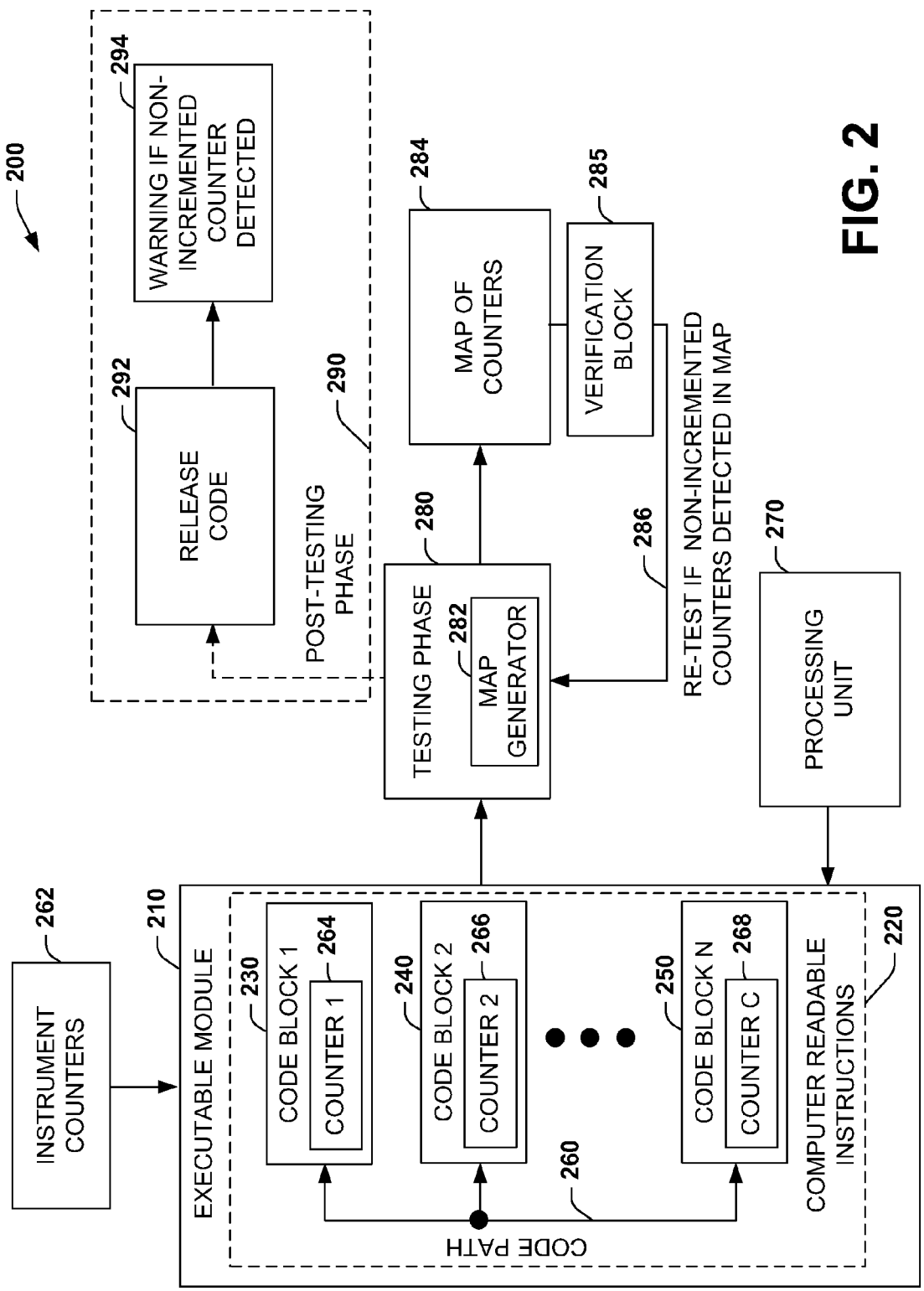
FIG. 2 illustrates an example of a code block verification system and example test sequence.

FIG. 2 illustrates an example of a code block verification system 200 and example test sequence. Similar to FIG. 1, the system 200 includes an executable module 210 that includes computer readable instructions 220. The executable module includes a plurality of code blocks shown as code block 1 at 230, code block 2 at 240, through code block N at 250, where N is a positive integer. The code blocks 230-250 represent various branches of computer readable instructions 220 that operate in the executable module 210, where such branches are illustrated in accordance with a code path 260. When the code blocks 230-250 have been identified (e.g., by a programmer or automatically by a computer) within the execution module 210, instrument counters 262 are associated with the various code blocks and illustrated as counter 1 at 264, counter 2 at 266, and counter C at 268, where C is a positive integer that is generally correlated to the number of code blocks, N. The counters 264-268 represent whether or not a code block has been executed as well as the number of times it has been executed. The system 200 includes a processing unit 270 to execute the computer readable instructions 220 in the executable module 210. Such processing unit 270 can also be employed to execute functions corresponding to various test phases that are disclosed herein.

When the counters 264-268 have been associated with the respective code blocks 230-250, a testing phase 280 can be entered. The testing phase 280 can include a training phase where the executable module 210 is initially exercised and the counters 264-268 incremented if a given branch of the code path 260 has executed. A map generator 282 can generate a map of counters 284 that quantifies the values of the counters 264-268 for each of the respective code blocks 230-250. The map of counters 284 can include a testing profile or behavior map. Such map can be employed to determine normalized operations for a given block of code. Thus, if other code blocks are added in the future, the normalized behavior can be checked against the additions to verify previous functionality has remained substantially consistent.

A verification block 285 can analyze the map 284 to determine if any code blocks have not been executed. If the verification block 285 determines that any of the counters 264-268 have not been incremented (e.g., zero value), a re-test loop can be initiated (e.g., automatically by the verification block 285 of the testing phase 280 or manually by a test engineer) as shown at reference numeral 286. Re-tests can be run as many times as desired or until a level of confidence has occurred (e.g., re-test until all counters have non-zero value or 90% of counters have non-zero value and so forth). After the training phase, intermediate phases of the testing phase 280 can be executed and reiterated at 286 as desired.

After a level of confidence has developed with the intermediate testing phase 280, a post-testing phase can be entered as shown at 290. In the post-testing phase the code is deemed to be release code 292 which generally indicates the code has been shipped or provided to users of the respective code. As the code is executed by users of the release code 292, warnings can be generated at 294 if a non-incremented counter is detected during operation of the release code 292. Moreover, the release code 292 can be designed to terminate execution if a counter that was not incremented during testing is detected during execution of the release code 292. If such warning and/or halt of execution were generated at 294, the designer of the release code 292 can be notified (e.g., e-mail automatically generated, instant message opened, web page launched) that a non-tested portion of release code 292 was encountered. The designer can then initiate further actions such as recall, re-testing, re-design, and so forth as deemed appropriate.

The system 200 can be provided as part of a testing platform coupled to a network, where the platform includes a memory for storing computer readable instructions 220. The processing unit 270 accesses the memory and executes the computer readable instructions 220. The computer readable instructions 220 can include a code block 230-250 to provide instructions associated with the executable module 210 and a counter 264-268 associated with the code block to indicate the code block has been executed during testing.

Counters can be handled differently depending on the phase or test sequence. In one example, hook calls may be employed to increment, maintain, or otherwise verify operation of a given counter and associated code block. For example, a hook call can correspond to a subroutine call (typically with at least one argument to identify it uniquely). These can be provided as entry points into a given library and may be used to provide particular specialization code. Hook subroutines, for example, can be implemented via some type of high-level script or via a supplied low-level code library. In the example system 200, hook calls could be placed at the start of each block, such as by a source-code compiler and/or binary linker optimizing tool. This generally does not change the block structure itself but adds an extra branching or subroutine call at the start of each code block. As an example, such hook calls can be implemented via supplied low-level libraries (e.g., one hook procedure library designated for use during the training phase 280 and another for use during the post-testing phase 290).

Operation of the hook call may depend upon the mode of operation (e.g. either training or normal). During the training phase 280, the call to the hook procedure could increment the appropriate block count, for example. During normal operation, the hook procedure library could be replaced with a library containing code to keep track of the counters. In each case, the call to the hook procedure could use an argument to determine uniquely to which counter the call refers. The appropriate action to take could be determined by supplying a different code library to implement the hook calls—depending upon the operating mode (e.g., either training or normal). In normal operation, the hook calls check that the associated counter is non-zero and then allowing execution to continue onwards or otherwise take exceptional action. A potential advantage of the hook call approach is that a recompile of the original source may not be necessary to switch modes—thus, only the code library implementing the hook subroutines may need to be changed.

Figure 3:
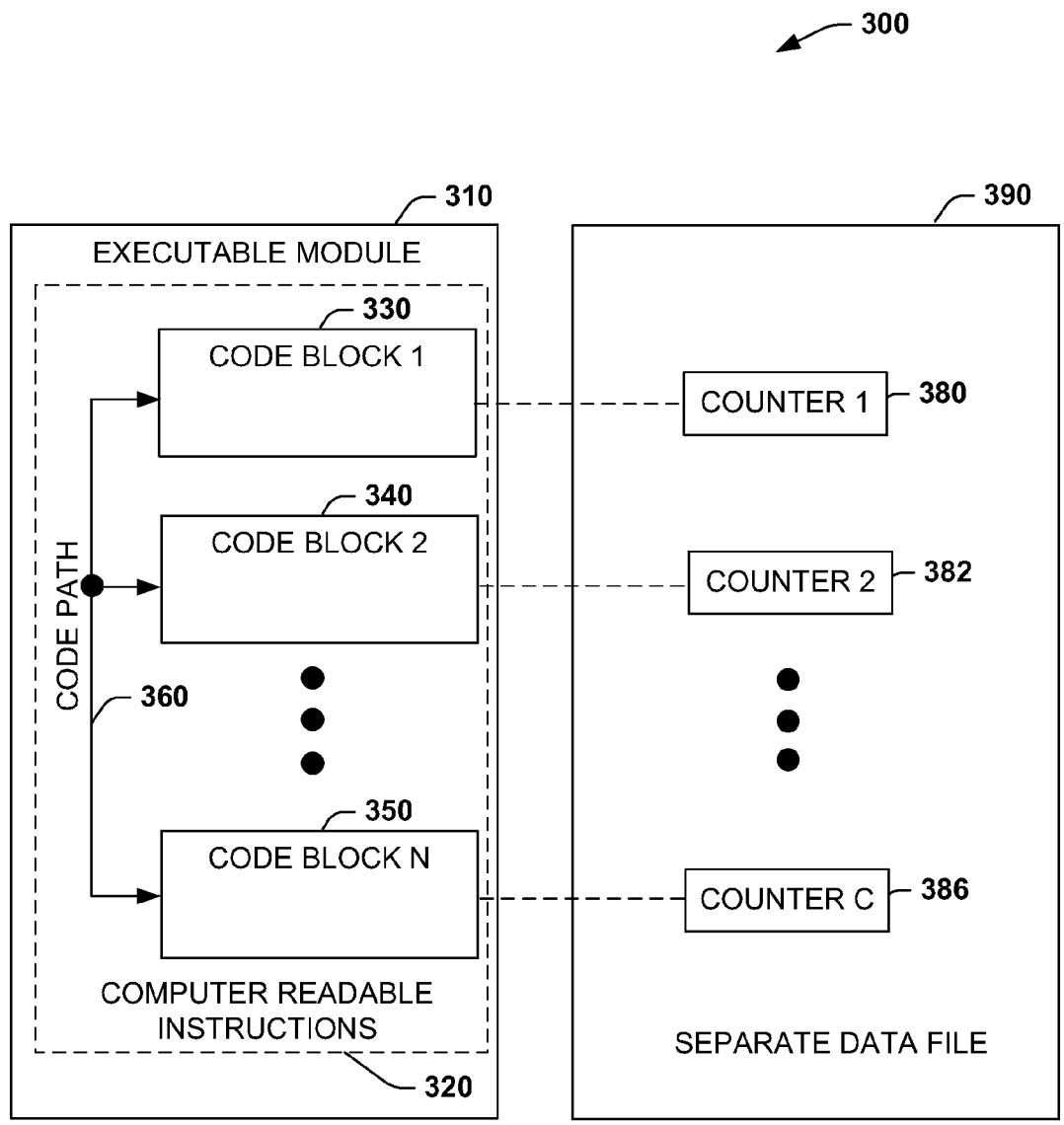
FIG. 3 illustrates an example of a code block verification system where counters are stored in an external file.

FIG. 3 illustrates an example of a code block verification system 300 where counters reside external to the code blocks. Similar to FIG. 1 above, the system 300 includes an executable module 310 that includes computer readable instructions 320. The executable module 310 includes a plurality of code blocks shown as code block 1 at 330, code block 2 at 340, through code block N at 350, where N is a positive integer. The code blocks 330-350 can represent various branches of computer readable instructions 320 that operate in the executable module 310, where such branches are illustrated in accordance with a code path 360. For example, the code path 360 can represent different branches or decisions that are encountered during the execution of a program as described above.

Counters, shown as counter 1 at 380, counter 2 at 382, and counter S at 386, are associated with respective code blocks 330, 340 and 350. When the code blocks 330-350 have been identified within the execution module 310, the counters 380, 382, and 386 can be installed in a file 390 that is separate from the code blocks 330, 340 and 350. The number of counters S can be correlated to the number of code blocks N; however, not all code blocks may have a counter. For instance, some code blocks may be identified as non-used code. The association of counters 380, 382 and 386 with respective code blocks 330, 340 and 350 can be user configurable. Additionally, counters can be implemented to verify if a set of predetermined counters increment in a specified order. The counters 380-386 can provide values that represent whether or not a respective code block has been executed. Additionally, the value of a counter can indicate how many times a given code block has been executed. For example, if code block 1 at 330 were executed at least one time, the counter 380 would show a positive value of 1 (greater than 1 if executed more than one time). If the code block 2 at 340 were never executed, then its respective counter 2 at 382 would show a non-incremented value (e.g., zero).

Figure 4:
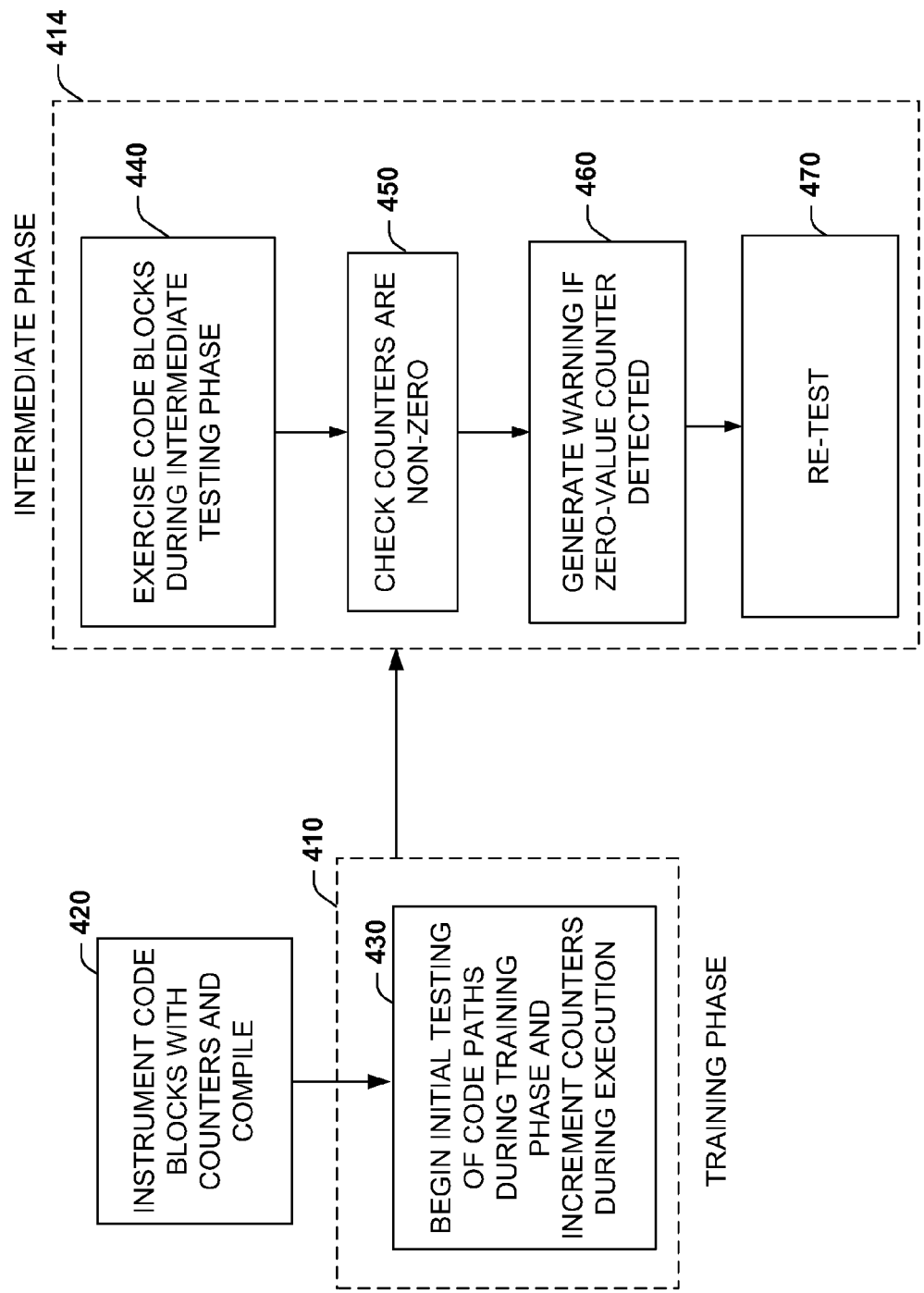
FIG. 4 illustrates an example of a training phase and an intermediate phase for code block verification.

FIG. 4 illustrates an example of a training phase 410 and an intermediate phase 414 for code block verification. As shown, before the training phase 410 begins, source code blocks are instrumented with counters at 420 and subsequently compiled. Alternatively, the counters can be installed during compilation and/or during object code execution. After an application has been compiled at 420, it enters the training phase 410. During this phase 410, in response to executing a code block, a counter unique to the code block is incremented as shown at 430. At the end of training phase 410, the code enters production in the intermediate phase 414 in which the counter of each code block that had executed has incremented to a non-zero value commensurate with the number of times it had executed. However, the training phase may not be completely trusted. The code blocks are then exercised during the intermediate testing phase, as shown at 440. In response to executing a code block, the unique counter associated with the block is evaluated (e.g., by the verification block 285 of FIG. 1) to determine if it is non-zero as illustrated at 450. If the counter is zero, then the code was not traversed during its training phase 410. In this case, a warning can be generated. For example, the warning issued at 460 can identify the source code and line number for the non-executed code block. Further re-testing can commence at 470 where the code re-enters the training phase 410 or reiterates within the intermediate phase 414. Such reiterations or testing can be continued until a desired level of quality is achieved (e.g., one hundred thousand runs have been executed and no non-incremented counters were detected).

Figure 5:
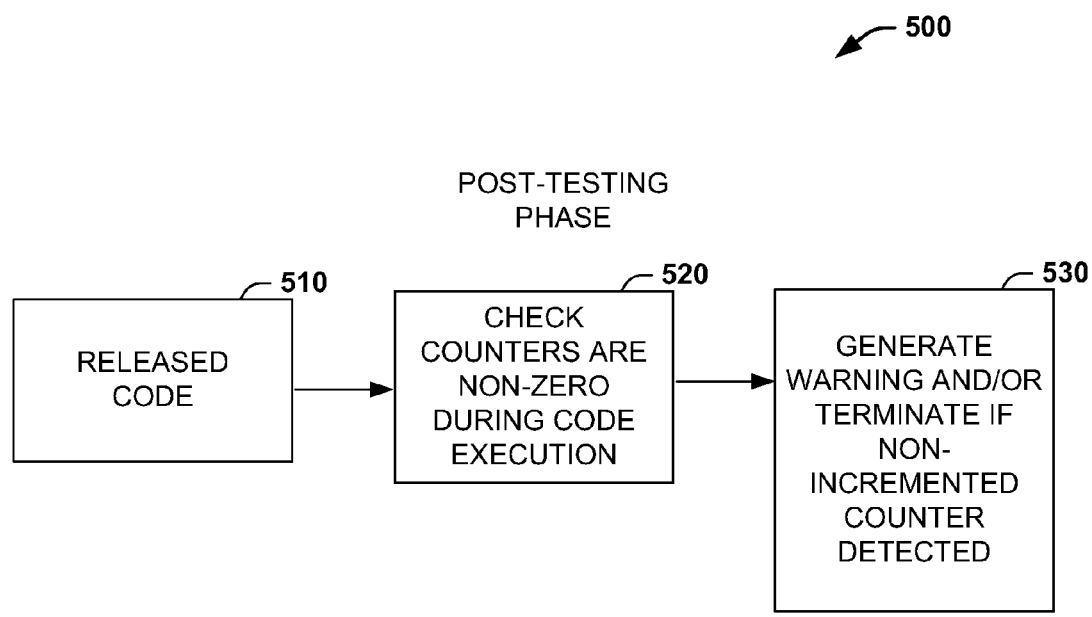
FIG. 5 illustrates an example of a post-testing phase for code block verification.

FIG. 5 illustrates an example of a post-testing phase 500 for code block verification. As shown, at some subsequent stage of code development and testing, the code is deemed as released code 510. Thus, the behavior of the intermediate phase code described above is changed where counters are checked at 520 and entering an untested block can result in termination of the process at 530. For example, a verification block can be installed with the released code to determine if a counter for a given code block increments for the first time during execution of the released code. A warning can be generated at 530, a warning with termination of execution, or merely termination of execution can occur at 530 if a non-incremented counter (e.g., having a zero value) is detected during execution of the released code 510. If the non-incremented counter is encountered during the post-testing phase at 530, automated messages can be generated to contact the manufacturer or designer, which can take appropriate action such as recalling the product and retesting before generating a subsequent version of the released code 510, issuing a software patch or the like.

Figure 6:
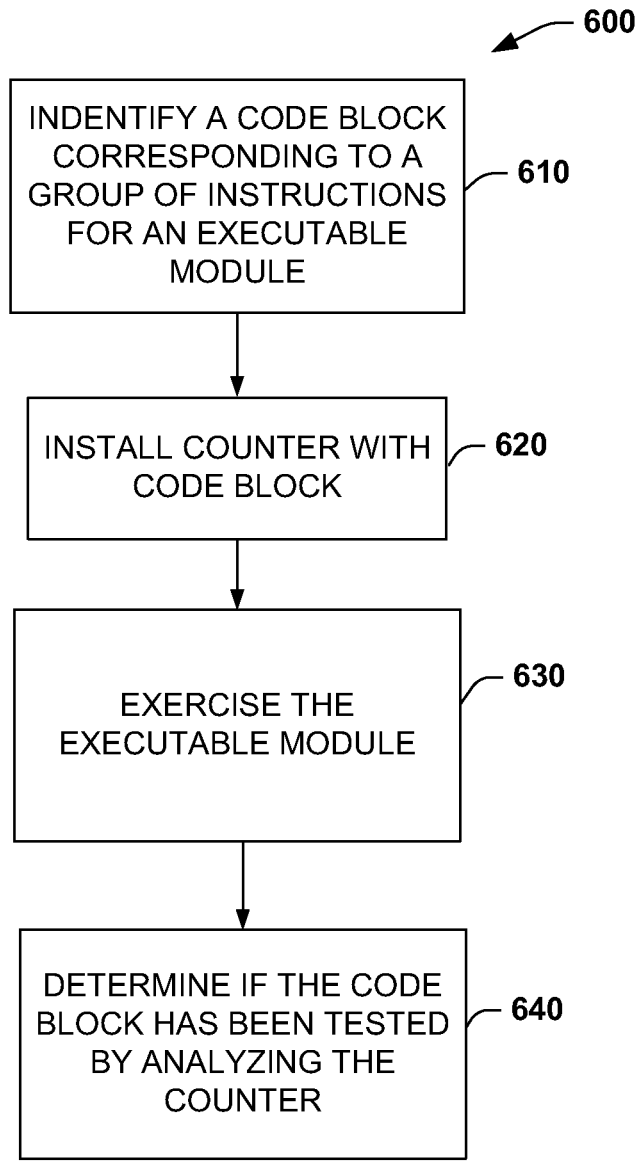
FIG. 6 illustrates an example method for code block verification.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by a computer and associated equipment, for example.

FIG. 6 illustrates an example method 600 for code block verification. The method 600 includes identifying a code block corresponding to a group of instructions for an executable module at 610. As described previously, this can involve analyzing for branches, loops, interrupts, conditional statements, and so forth to determine where a new execution path begins. The identifying of code blocks can be implemented manually (e.g., by a programmer), automatically (e.g., by a computer) or a combination of manual and automatic mechanisms can be used. At 620, the method 600 includes installing a counter with the code block. For example, such installation can be performed by source code modification, complier modification of the source code, and/or object code modification as disclosed herein. The counter can be programmed to increment when the respective code block executes. At 630, the method 600 includes exercising the executable module, such as operating the executable module during a training or intermediate testing phase. At 640, the method 600 includes determining if the code block has been tested by analyzing the counter. The counter may have been incremented in a training phase when its associated code block is executed during a testing phase, such as disclosed herein. As described above, determining if a code block has been tested generally includes analyzing the counter for zero and non-zero values, where a zero value indicates a code block has not been tested and a non-zero value indicates a code block has been tested.

What have been described above are examples. One of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium comprising computer executable instructions that when executed cause a processor to:
   identify a group of instructions corresponding to a code block of an executable module;
   increment a counter associated with the code block to indicate the code block has been tested during a training phase;
   monitor a value of the counter of the code block during execution of release code that has been provided to a user of the executable module to determine whether or not the executable module had been tested during the training phase; and
   stop code execution of the executable module if the monitored value of the counter during run-time operation of the release code indicates that the code block had not been tested during the training phase.

2. The computer readable medium of claim 1, further comprising computer executable instructions to increment the counter during the training phase in response to the code block being executed.

3. The computer readable medium of claim 2, further comprising computer executable instructions to verify the counter for a non-zero value during an intermediate testing phase and to generate the warning if a zero value is detected.

4. The computer readable medium of claim 1, further comprising computer executable instructions to generate a warning if the value of the counter during execution of the release code during the post-training phase indicates that the executable module had not been tested prior to the post-training phase.

5. The computer readable medium of claim 1, further comprising computer executable instructions to implement a nested counter or a concurrency counter to monitor execution of a code path combination comprising multiple code blocks.

6. The computer readable medium of claim 1, further comprising computer executable instructions to implement a map generator to generate a map from a plurality of counters, corresponding to respective code blocks in the executable module, to verify performance of the executable module or to generate a test behavior profile.

7. The computer readable medium of claim 1, wherein the counter is located in the code block after an entry point to the code block.

8. A method, comprising:
identifying a code block corresponding to a group of instructions for an executable module;
installing, by a processor, a counter for execution with the code block that has been identified for the executable module;
exercising the executable module;
determining, by the processor, if the code block has been tested by analyzing the counter during a training phase,
monitoring a value of the counter of the code block during execution of release code that has been provided to a user of the executable module to determine whether or not the executable module had been tested during the training phase; and
terminating code execution of the executable module if the monitored value of the counter during run-time operation of the release code indicates that the code block had not been tested during the training phase.

9. The method of claim 8, further comprising generating a map to determine a testing behavior for the code block.

10. The method of claim 8, further comprising sending a notification via an e-mail, an instant message, or a web page that a non-tested portion of the release code was encountered.

11. The method of claim 8, further comprising generating a warning if the non-incremented counter is detected after the training phase.

12. The method of 8, further comprising associating the counter with the code block via a source code modification.

13. The method of 8, further comprising associating the counter with the code block via a modification by a compiler.

14. The method of 8, further comprising associating the counter with the code block via an object code modification by a virtual machine.

15. A code testing system comprising:
a memory storing computer executable instructions, the memory comprising code blocks to correspond to respective groups of instructions of an executable module; and
a processing unit to access the memory and execute the computer executable instructions, the computer executable instructions, when executed causing the processing unit to:
increment a counter to provide an indication of testing of a code block during a training phase;
monitor a value of the counter of the code block during execution of release code that has been provided to a user of the executable module to determine whether or not the executable module had been tested during the training phase;
generate a warning during runtime operation of the release code if the value of the counter indicates that the code block had not been executed during the training phase; and
terminate code execution of the executable module if the monitored value of the counter during run-time operation of the release code indicates that the code block had not been tested during the training phase.

16. The system of claim 15, wherein the instructions are further to generate a map to determine a testing behavior for the code block.

17. The system of claim 15, wherein the instructions are further to generate a map from a plurality of counters, corresponding to respective code blocks in the executable module, to verify performance of the executable module.

18. The system of claim 15, wherein the instructions are further to generate a map from a plurality of counters, corresponding to respective code blocks in the executable module, to generate a test behavior profile of the executable module.

19. The system of claim 15, wherein the instructions are further to implement a nested counter or a concurrency counter in the code block to monitor execution of a code path combination comprising multiple code blocks.

20. The system of claim 15, wherein the counter is located in the code block after an entry point to the code block.

* * * * *